United States Patent [19]

Jones et al.

[11] 4,212,487
[45] Jul. 15, 1980

[54] HOSE COUPLING

[75] Inventors: Walter L. Jones, Arnold; Willard G. Triest, Annapolis, both of Md.

[73] Assignee: Hydrasearch Co. Inc., Annapolis, Md.

[21] Appl. No.: 961,627

[22] Filed: Nov. 17, 1978

[51] Int. Cl.² .............................................. F16L 33/16
[52] U.S. Cl. ...................................... 285/95; 285/243; 285/259; 285/323
[58] Field of Search ............... 285/243, 255, 259, 323, 285/322, 104, 421, 95

[56] References Cited

U.S. PATENT DOCUMENTS

| 589,216 | 8/1897 | McKee | 285/259 X |
|---|---|---|---|
| 1,235,876 | 8/1917 | Cave | 285/259 X |
| 1,300,956 | 4/1919 | Greve | 285/259 X |
| 3,222,091 | 12/1965 | Marshall | 285/243 X |
| 4,157,843 | 6/1979 | Trnka et al. | 285/259 X |

FOREIGN PATENT DOCUMENTS

| 649694 | 12/1962 | Italy | 285/243 |
|---|---|---|---|
| 196845 | 5/1923 | United Kingdom | 285/243 |

*Primary Examiner*—Thomas F. Callaghan
*Attorney, Agent, or Firm*—William J. Dick

[57] ABSTRACT

Disclosed is a self tightening hose coupling which when applied to a hose comprises a floating sandwich like structure including a floating stem, hose, and tapered wedge segments which operate as a unit and float between a nipple and a compression sleeve. The compression sleeve has a tapered interior which matches the taper of the wedges and is constructed to permit the interior placement of a locking ring which operates against a split retaining ring mounted on the nipple thereby preventing the floating sandwich like structure from being pulled out when internal fluid or tensile pressures, occur under operating conditions.

12 Claims, 6 Drawing Figures

HOSE COUPLING

SUMMARY OF THE INVENTION AND STATE OF THE PRIOR ART

The present invention relates to hose couplings and more particularly relates to hose couplings especially adapted for high pressure and/or high temperature use.

Oil rigs which are presently being constructed in the Gulf of Mexico and/or the North Sea etc. require pile driving rigs for placing the pilings into the ocean floor. Presently these rigs are driving 84 inch pipe piles which have 3 inch side wall thickness into the ocean floor to a depth of 400 feet or more. The hammers employed are approximately 37 feet square and 76 feet tall, and of necessity are getting larger. As in the past, the hammers are steam driven and some of the newer hammers presently under construction require two four inch diameter by 250 foot strings of high pressure steam hose, although a single six or eight inch hose may be preferred. The amount of energy required for driving the hammers to move the pilings to such depth is quite large, requiring special hose and special couplings. The hoses being employed in such service are generally reinforced for example of spiral cable or wire construction to insure strength. Conventional couplings tend to tear the hose or tube or even break away from the hose. Either of these conditions may be quite dangerous to personnel working on the rig and, of course, is economically disadvantageous because of the loss of time in laying or coupling new hose, plus the expense of the hose. There are numerous prior art couplings which are adapted to couple high pressure hose. For the most part these couplings include a stem or nipple which is placed interiorally of the hose, the nipple having some sort of serrated exterior to grip the interior of the hose. A combination wedge type structure which includes an exterior sleeve is then placed externally of the hose and attempts to grip the outer section of the hose and press it against the internal serrations on the exterior of the nipple. Many of these couplings are quite successful for less severe service but with large diameter hose under very heavy duty service tend to cause ripping or tearing of the hose and eventual failure. The problem appears to reside in an increase in sheer stress between the inner and outer portion of the hose carcass. For example, with the stem or nipple which is projecting interiorally of the hose, with, for example, serrations thereon, the outer wedge like segments which grip the outer carcass of the hose tend under pressure to move longitudinally or axially of the hose creating excessive sheer stresses between the interior and the exterior of the hose. Secondly, stress in the carcass from the prior art type couplings is localized over small areas causing rupture of the hose carcass at various locations internally of the coupling or immediately adjacent thereto.

In view of the above, it is a principle object of the present invention to provide a coupling which will withstand high temperatures and high pressures, while inhibiting major sheer stresses between the inner and outer casing of the hose at the coupling.

Another object of the present invention is to provide a coupling which may be easily secured in place.

Other objects and a more complete understanding of the invention may be had by referring to the following specification and claims taken in conjunction with the accompanying drawings in which:

SPECIFIC DESCRIPTION

Figure 1:
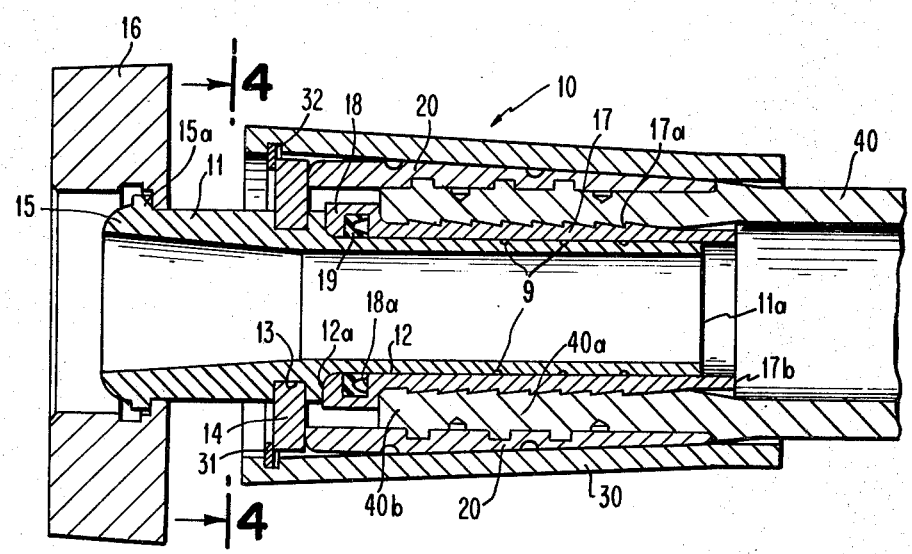
FIG. 1 is a fragmentary side elevational sectional view of a coupling constructed in accordance with the present invention and connected to a hose.

Referring now to the drawings, and especially FIG. 1 thereof, a coupling 10 constructed in accordance with the present invention is illustrated therein. As shown, the coupling 10 is connected to a hose 40, the hose, if for high temperature, high pressure work being preferably of a reinforced construction.

Figure 2:
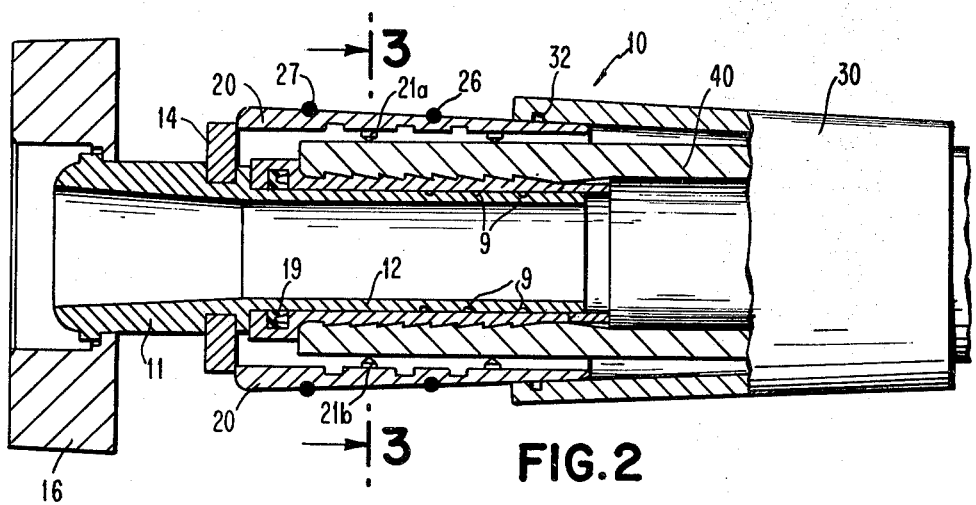
FIG. 2 is a view similar to FIG. 1 but illustrating the coupling of FIG. 1 in an uncoupled state.

Turning now to the coupling 10, the coupling comprises a tube like nipple 11 having an external recessed portion 12 terminating in an annular shoulder 12a at the forward end and a rear terminal end 11a, the nipple being dimensioned for insertion into the interior of the hose 40 inside a floating stem 17. Forward of the shoulder 12a is an annular groove 13 in the exterior of the nipple 11, the groove being dimensioned to seat therein a split stem ring 14, the purpose of which will be more fully described hereinafter. The forward end of the nipple 11 may be made in any conventional manner, male or female, in the present instance, the nipple 11 including a forward end 15 having a suitable radially extending flange 15a for capturing a nut 16, the flange limiting the forward axial movement of the nut 16 while permitting rotation of the nut so as to enable capturing of, for example, a threaded male coupling. In accordance with the invention, and in order to inhibit extreme localized sheering stresses on the hose, i.e., that the hose be uniformly gripped as opposed to localized stressing, the hose terminal end and its adjacent portions 40a are captured intermediate a floating stem and wedge segment structure to form a floating sandwich like structure. To this end, and referring first to FIGS. 1 and 2, a stem 17 is mounted on the recessed portion 12 of the nipple 11, circumscribing and mounted for sliding movement on the nipple 11. As illustrated, the stem 17 includes a serrated or saw tooth exterior 17a terminating in an enlarged radially extending flange like portion 18 at its forward end which is adapted for abutting engagement with the shoulder 12a of the nipple 11. As shown, the floating stem 17 includes an after end 17b which preferably extends beyond the terminal end 11a of the nipple 11 to reduce turbulence in fluid flow. A circumferentially extending groove 18a within the flange portion 18 houses a ring like seal 19 which engages the recessed portion 12 of the nipple 11 as well as the interior of the groove 18a and serves to inhibit leakage. As illustrated, the flange like portion 18 also serves as an end stop for and in conjunction with the shoulder 12a, the terminal end of the hose 40.

Figure 5A:
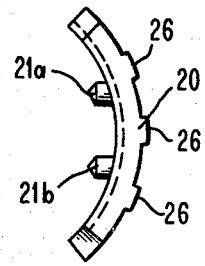
FIG. 5A is an end elevational view of a wedge segment illustrated in FIGS. 1, 2 and 3.
Figure 5B:
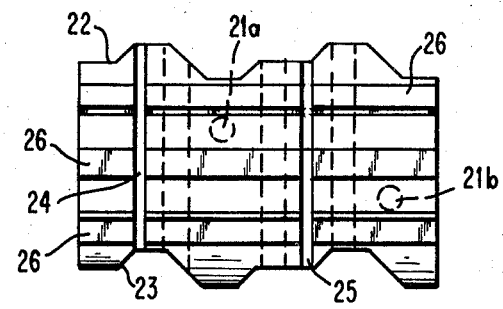
FIG. 5B is a side elevational view of the wedge segment illustrated in FIG. 5A.

In order to hold the hose against the floating stem 17 and in firm engagement therewith squeezing the entire inserted end of the hose from the terminal end of the floating stem 17 to the flange like projection 18, circumscribing the hose are a plurality of wedge segments 20. As shown the segments are tapered longitudinally of the axis of the hose, and adapted to overlie, embrace, and press the hose against the serrated exterior 17a of the stem 17. To this end, and referring first to FIGS. 5A and 5B, each of the wedge segments preferably includes inwardly projecting studs or lugs 21a, 21b which are axially spaced apart and serve to grasp the exterior of the hose in pressing engagement therewith. As illustrated, each of the segments, such as shown in FIG. 5A, are arcuate having a curvature approximately equal to the curvature of the exterior of the hose 40. Moreover, the lateral or longitudinally extending extremities of each of the wedge segments such as at 22 and 23 are stepped or undulating so that adjacent wedge segments, when squeezed into place as hereinafter described, will coact with one another to further inhibit fluid leakage intermediate the wedge segments.

Figure 3:
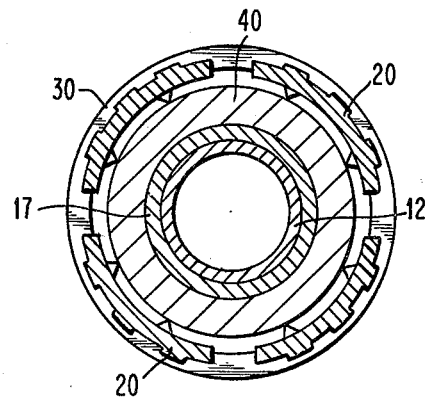
FIG. 3 is a sectional view taken along line 3—3 of FIG. 2.

To permit placement of the wedge segments so that they lie initially substantially as illstrated in FIG. 3, grooves 24 and 25 may be placed in the exterior of the segments so as to permit the use of, for example, O rings 26 and 27, such as illustrated in FIG. 3 to hold the wedge segments in place until a compression ring or sleeve 30 is drawn up over the wedge segments holding them in place. In this connection, the O ring wedge segment retainers 26 and 27 may be left in place, or simply snipped or removed by constructing personnel.

Figure 4:
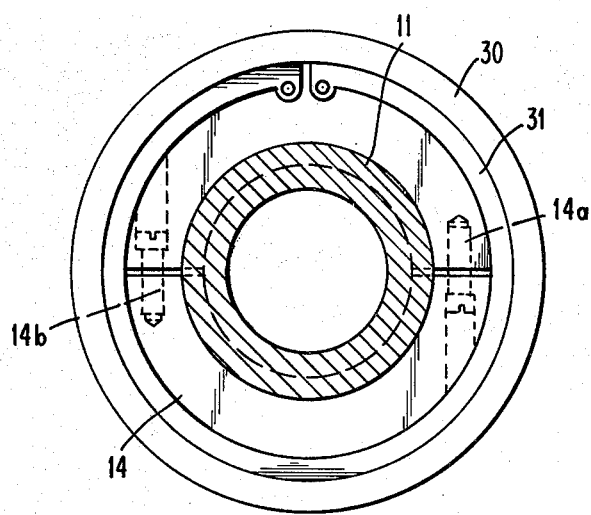
FIG. 4 is a sectional view taken along line 4—4 of FIG. 1.

In order to insure firm embracing and pressing of the wedge segments 20 against the hose, and the hose against the floating stem 17, a compression sleeve or ring 30 may be drawn up over the wedge segments, the compression ring or sleeve 30 having a wedge like or tapered cross section which complements and coacts with the longitudinal taper of the wedge segments 20 thereby forcing the wedge segments, which abut the split stem ring 14 to be forced inwardly in pressing engagement against the hose and therefore against the floating stem 17. In this connection, it should be noted that the stem ring 14 acts as a stop for the wedge segments preventing the studs, which are imbedded in the hose carcass, from tearing the carcass as the sleeve is drawn up over the wedge segments. Moreover, the wedge segments 20 include longitudinally extending ribs 28 which serve to reduce the friction between the wedges and the sleeve when drawing up the sleeve and in operation. After the compression ring or sleeve 30 is drawn into the position illustrated in FIG. 1, a retaining ring (snap ring) 31 is inserted circumscribing the forward end of the nipple 11, abutting the split stem ring 14 and captured in a radially extending groove 32 in the interior of the compression ring or sleeve 30. The snap or retaining ring 31, by engaging the split stem ring 14, and being engaged within the groove 32 of the compression ring or sleeve 30, inhibits rearward longitudinal movement of the ring. The assembly of the coupling is relatively simple. The compression ring 30 is placed first over the hose 40. Floating stem 17 is placed in the hose until the flange like projection 18 abuts the terminal end of the hose, and then the annular seal 19 is placed within the groove 18a. If a female coupling is being made up, such as shown in the drawings, nut 16 is then placed on the nipple 11 and brought up until it bears against the flange 15a circumscribing the terminal end 15 of the nipple 11. Split stem ring 14 is then bolted together as by bolts 14a and 14b, (see FIG. 4) into the groove 13 of the nipple 11, and then the nipple is inserted into the floating stem 17. Thereafter, the four wedge segments 20 are positioned circumscribing the hose 40 overlying and embracing the hose portion 40a into pressing engagement with the serrations 17a of the floating stem 17. The O ring wedge segment retainers 26 and 27 may be placed into the grooves 24 and 25 to retain the segments in their desired position and the compression sleeve is then drawn towards the boss nut as by a press. The compression ring is then drawn up into a position substantially as shown in FIG. 1, wherein the retaining ring 31 is positioned in the groove 32 interiorly of the compression ring or sleeve 30. The assembly is now ready for use.

In operation, as pressure builds up and tension in the hose increases tending to separate the nipple 11 from the hose 40, the sandwich structure comprising the wedge segments 20, the hose 40, and the floating stem 17 tends to move rearwardly of the sleeve and nipple increasing its pressure between the sleeve and nipple. As the stem 17 is free for limited axial movement longitudinally of the hose 40, the increase in the crushing action of the wedge segments against the floating stem causes increased stress on the hose 40, which stress is uniform across both the outer portion of the hose and the interior of the hose thereby decreasing the sheer stress differential that occurs in conventional couplings between the interior and the exterior of the hose. In this connection, it should be noted that under high pressure use, the nipple 11 preferably contains hydraulic balancing grooves 9 to prevent a hydraulic imbalance which would tend to force the nipple 11 against the stem 17 inhibiting free movement of the sandwich like structure. Accordingly the coupling of the present invention provides a simple and yet superior method of coupling a hose without fear of breakage of the hose at the coupling.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed.

What is claimed is:

1. A hose coupling comprising a nipple dimensioned for insertion into a hose, a stem circumscribing and mounted for sliding movement on said nipple, means on said stem for gripping the interior of a hose;

a plurality of longitudinally extending wedge shaped segments radially spaced from said stem and for embracing a length of hose between said stem and wedge shaped segments;

a compression sleeve circumscribing said wedge shaped segments, said sleeve having an interior for engaging and embracing said wedge shaped segments, and means to inhibit axial movement of said compression sleeve relative to said nipple when said coupling is connected to said hose and subject to fluid pressure interiorly thereof for permitting limited axial movement of both said stem and said wedge segments with said hose and relative to said nipple and said sleeve to increase the grip of said wedge segments and said stem against said hose.

2. A hose coupling in accordance with claim 1 including a ring mounted on said nipple for abutting engagement of said segments there against.

3. A hose coupling in accordance with claim 1 including a seal means intermediate said stem and said nipple.

4. A hose coupling in accordance with claim 3 including a recess in said stem for housing said seal means.

5. A hose coupling in accordance with claim 1 wherein said longitudinally extending wedge shaped segments include complementary lateral and stepped extremities which coact to inhibit relative axial movement of said wedge shaped segments with respect to each other.

6. A hose coupling in accordance with claim 5 including means in said wedge shaped segments for gripping the exterior of a hose carcass.

7. A hose coupling in accordance with claim 6 wherein said means on said wedge shaped segment for gripping the exterior of a hose carcass comprises inwardly projecting studs.

8. A hose coupling in accordance with claim 1 wherein said means to inhibit axial movement of said compression sleeve comprises a snap ring circumscribing said nipple, and a circumferentially extending recess in said compression sleeve for receiving said snap ring.

9. A hose coupling in accordance with claim 8 including a ring mounted on said nipple for abutting engagment of said segments thereagainst, said snap ring abutting said ring.

10. A hose coupling in accordance with claim 9 wherein said longitudinally extending wedge shaped segments include complementary lateral and stepped extremities which coact to inhibit relative axial movement of said wedge shaped segments with respect to each other.

11. A hose coupling in accordance with claim 10 including means for initially holding said segments in position circumscribing said hose.

12. A hose coupling in accordance with claim 11 wherein said means for initially holding said segments in position comprises grooves in the exterior of said wedge segments and resilient means in said grooves.

* * * * *